United States Patent
Hall et al.

(10) Patent No.: US 10,296,741 B2
(45) Date of Patent: *May 21, 2019

(54) SECURE MEMORY IMPLEMENTATION FOR SECURE EXECUTION OF VIRTUAL MACHINES

(71) Applicant: INTERNATIONAL BUSINESS MACHINES CORPORATION, Armonk, NY (US)

(72) Inventors: William E. Hall, Clinton, CT (US); Guerney D. H. Hunt, Yorktown Heights, NY (US); Ronald N. Kalla, Round Rock, TX (US); Jentje Leenstra, Bondorf (DE); Paul Mackerras, Weston (AU); William J. Starke, Round Rock, TX (US); Jeffrey A. Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 10 days.

This patent is subject to a terminal disclaimer.

(21) Appl. No.: 15/661,057

(22) Filed: Jul. 27, 2017

(65) Prior Publication Data

US 2019/0034627 A1    Jan. 31, 2019

(51) Int. Cl.
*G06F 21/00* (2013.01)
*G06F 21/55* (2013.01)
(Continued)

(52) U.S. Cl.
CPC ........ *G06F 21/556* (2013.01); *G06F 9/45558* (2013.01); *G06F 12/1441* (2013.01);
(Continued)

(58) Field of Classification Search
USPC ................................................. 711/100–173
See application file for complete search history.

(56) References Cited

U.S. PATENT DOCUMENTS 5,737,760 A * 4/1998 Grimmer, Jr. ....... G06F 12/1433
                                                         711/163
7,136,488 B2 * 11/2006 Hashimoto ......... G06F 9/30003
                                                         380/277
(Continued)

FOREIGN PATENT DOCUMENTS

WO    2016048478 A1    3/2016
WO    2016176126 A1    11/2016
(Continued)

OTHER PUBLICATIONS

Jin et al., "Secure MMU: Architectual Support for Memory Isolation among Virtual Machines", Appears in the 7th Workshop on Hot Topics in System Dependability (HotDep '11), IEEE 2011, pp. 217-222.

(Continued)

*Primary Examiner* — Maung T Lwin
(74) *Attorney, Agent, or Firm* — Dmitry Paskalov (57) ABSTRACT

An embodiment involves secure memory implementation for secure execution of virtual machines. Data is processed in a first mode and a second mode, and commands are sent to a chip interconnect bus using real addresses, wherein the chip interconnect bus includes a number of bits for the real addresses. A memory controller is operatively coupled to a memory component. A secure memory range is specified by using range registers. If the real address is detected to be in the secure memory range to match a memory component address, a real address bit is set. If the real address is in the memory address hole, a security access violation is detected. If the real address is not in the secure address range and the real address bit is set, the security access violation is detected.

8 Claims, 9 Drawing Sheets

(51) Int. Cl.
  *G06F 13/364*  (2006.01)
  *G06F 13/40*  (2006.01)
  *G06F 12/14*  (2006.01)
  *G06F 21/53*  (2013.01)
  *G06F 9/455*  (2018.01)
  *G06F 21/62*  (2013.01)

(52) U.S. Cl.
  CPC .......... *G06F 13/364* (2013.01); *G06F 13/404* (2013.01); *G06F 21/53* (2013.01); *G06F 21/6281* (2013.01); *G06F 2009/45587* (2013.01); *G06F 2212/1052* (2013.01); *G06F 2221/034* (2013.01)

(56) References Cited

U.S. PATENT DOCUMENTS

| | | | | |
|---|---|---|---|---|
| 7,356,668 | B2* | 4/2008 | Morais | G06F 12/1408 |
| | | | | 711/211 |
| 7,730,544 | B2* | 6/2010 | Volp | G06F 9/3851 |
| | | | | 726/26 |
| 8,051,467 | B2* | 11/2011 | Renno | G06F 21/79 |
| | | | | 726/27 |
| 8,578,175 | B2 | 11/2013 | Boivie et al. | |
| 8,819,446 | B2 | 8/2014 | Boivie | |
| 8,850,557 | B2 | 9/2014 | Boivie et al. | |
| 8,954,752 | B2 | 2/2015 | Boivie et al. | |
| 9,323,921 | B2 | 4/2016 | Hunt et al. | |
| 9,639,487 | B1* | 5/2017 | Wentzlaff | G06F 12/0813 |
| 2001/0052054 | A1* | 12/2001 | Franke | G06F 12/0806 |
| | | | | 711/147 |
| 2007/0209072 | A1* | 9/2007 | Chen | G06F 21/10 |
| | | | | 726/16 |
| 2010/0332850 | A1 | 12/2010 | Boivie | |
| 2012/0173841 | A1* | 7/2012 | Meier | G06F 12/1009 |
| | | | | 711/202 |
| 2013/0061058 | A1 | 3/2013 | Boivie et al. | |
| 2013/0138975 | A1* | 5/2013 | Martinez | G06F 12/1483 |
| | | | | 713/193 |
| 2015/0089502 | A1 | 3/2015 | Horovitz et al. | |
| 2015/0277949 | A1 | 10/2015 | Loh et al. | |
| 2016/0171248 | A1 | 6/2016 | Nesher et al. | |
| 2016/0171250 | A1 | 6/2016 | Boivie et al. | |
| 2016/0232105 | A1* | 8/2016 | Goss | G06F 21/575 |

FOREIGN PATENT DOCUMENTS

| | | |
|---|---|---|
| WO | 2016209547 A1 | 12/2016 |
| WO | 2017001580 A1 | 1/2017 |
| WO | 2017014887 A1 | 1/2017 |

OTHER PUBLICATIONS

CVE—"CVE-2015-3456, Common Vulnerabilites and Exposures", The Standard for Information Security Vulnerability Names, https://cve.mitre.org/cgi-bin/cvename.cgi?name=cve-2015-3456,printed Jul. 17, 2017, pp. 1-4.

Hetzelt et al., "Security Analysis of Encrypted Virtual Machines", arXiv: 1612.01119v1 [cs.CR]. Dec. 4, 2016, pp. 1-13.

Tucker, http://www.defenseone.com/technology/2015/07/how-break-cias-cloud-. . ., "How to Break Into the CIA's Cloud on Amazon—Defense One", printed Jun. 23, 2017, pp. 1-2.

IBM, "Power ISA, Version 3.0 B", Mar. 29, 2017, pp. 1-1258.

Arm Security Technology, "Building a Secure System using TrustZone Technology", Copyright © 2005-2009 ARM Limited, PRD29-GENC-009492C, pp. 1-108.

Mell et al., "The NIST Definition of Cloud Computing", National Institute of Standards and Technology, Special Publication 800-145, Sep. 2011, pp. 1-7.

Hall et al., "Secure Memory Implementation for Secure Execution of Virtual Machines", U.S. Appl. No. 15/842,279, filed Dec. 14, 2017.

List of IBM Patents or Patent Applications Treated as Related. Filed Dec. 14, 2017. 2 pages.

* cited by examiner

SECURE MEMORY IMPLEMENTATION FOR SECURE EXECUTION OF VIRTUAL MACHINES

This invention was made with government support under Contract No. BAA 11-02 awarded by Department of Homeland Security, Science and Technology Directorate, Cyber Security Division; and under Contract No. FA8750-12-2-043 awarded by Air Force Research Laboratory Information Directorate. The government has certain rights to this invention.

FIELD OF THE INVENTION

The present invention relates generally to the field of Virtual Machines (VMs), and more particularly improving security of Virtual Machines (VMs) running under control of a hypervisor.

SUMMARY

Embodiments of the present invention provide systems, methods, and computer program products for secure memory implementation for secure execution of virtual machines. Data is processed in a first mode and a second mode, and commands are sent to a chip interconnect bus using real addresses; wherein the chip interconnect bus includes a number of bits for the real addresses; wherein the chip interconnect bus is larger than a number of bits needed for a maximum memory range supported by the computer system; wherein a first portion of the bits for real addresses which are not in the range of the supported maximum memory range is used to indicate whether to operate in the first mode or the second mode creating a memory address hole. A memory controller is operatively coupled to a memory component. A secure memory range is specified by using range registers. Responsive to determining that the real address is detected to be in the secure memory range to match a memory component address, a real address bit is inverted. Responsive to determining that the real address is in the secure memory address hole, a security access violation is detected. Responsive to determining that the real address is not in the secure address range and the real address bit is set, the security access violation is detected.

DETAILED DESCRIPTION

In cloud computing environments, Cloud Service Providers (CSPs) may manage customer applications using system software to provide services including access to system resources. CSP-managed software typically has complete control over customer application data. An operating system (OS) or a hypervisor may access and/or modify the customer application data. Additionally, security features implemented in a user space of a customer application may be tampered with by an OS or hypervisor without being detected. Typically, CSP-managed software is part of a trusted computing base. Customers may be required to trust that entities, which develop, deploy and control CSP-managed software, are not malicious. Additionally, customers may be required to trust that the CSP-managed software is secure against attacks which may compromise the confidentiality and integrity of the customer applications and the customer application data. Accordingly, customers and the CSP may be required to negotiate service agreements to achieve regulatory compliance, thereby ensuring that security and privacy requirements are met with respect to the customer application data.

Large and disparate teams of software developers may write many lines of software code to develop CSP-managed software including a hypervisor. Members of these teams may be responsible for isolating executables, in addition to Virtual Machines (VMs), from other members in order to protect sensitive information. In some instances, the members themselves may be exposed to potential security vulnerabilities. Accordingly, a Secure Memory Facility (SMF) is implemented to provide protection that is independent of the security of the entire CSP infrastructure. For example, the SMF provides secure isolation of VMs. In this embodiment, the SMF is implemented in hardware of a data processing system as well as a trusted software and firmware component. When this SMF is active, the hardware and firmware components making up the SMF are referred to as an "ultravisor," or alternatively, operating in an ultravisor mode.

In one embodiment, the SMF protects data (e.g., physical pages and other data) in memory (e.g., registers, cache, etc.) associated with secure virtual machines (SVMs) from being accessed by other software applications operating in other SVMs. Additionally, the SMF may protect data in memory associated with SVMs from software applications executed by a hypervisor and other software applications operating in VMs. For example, if a system software accesses a secured physical page, then an SMF may handle access to the secured physical page while protecting the secured physical page's integrity and confidentiality, regardless of whether a corresponding SVM is executing or resting. In this example, even a privileged attacker, such as a malicious or compromised hypervisor, may not access an SVM's memory pages, and thus not modify and/or tamper with customer application data or software code without detection.

In another embodiment, an SMF ensures that no unintended state of an SVM leaks to a hypervisor which attempts to access the SVM's secure memory, by preventing, or restricting, the hypervisor from accessing the SVM's secure memory. Furthermore, an SMF-enabled hardware may handle ultravisor and hypervisor interrupts, such that the ultravisor may securely save the SVM's registers into secure memory and clear the SVM's register content. Additionally, all secure data, including customer application data stored in secure memory, is still protected from access by the hypervisor upon a context switch. The ultravisor may encrypt a secure memory page and store the secure memory page in an encrypted format in memory, accessible by the hypervisor in instances where the hypervisor performs tasks, such as paging to disk storage. To return to the SVM after a context switch, a hypervisor may call the ultravisor explicitly, via a "ucall" or in another embodiment the SMF hardware may force the entrance of the ultravisor state, thereby enabling the ultravisor to securely restore the SVM's registers before returning to SVM execution.

Embodiments of the present invention provide methods, systems, and computer program products for preventing access to secure memory by a hypervisor and VMs and other chip interconnect bus slaves like I/O and accelerators like GPUs, connected directly (e.g., DMA engines) or indirectly (e.g., opencapi connected) to the chip interconnect bus.

Figure 1:
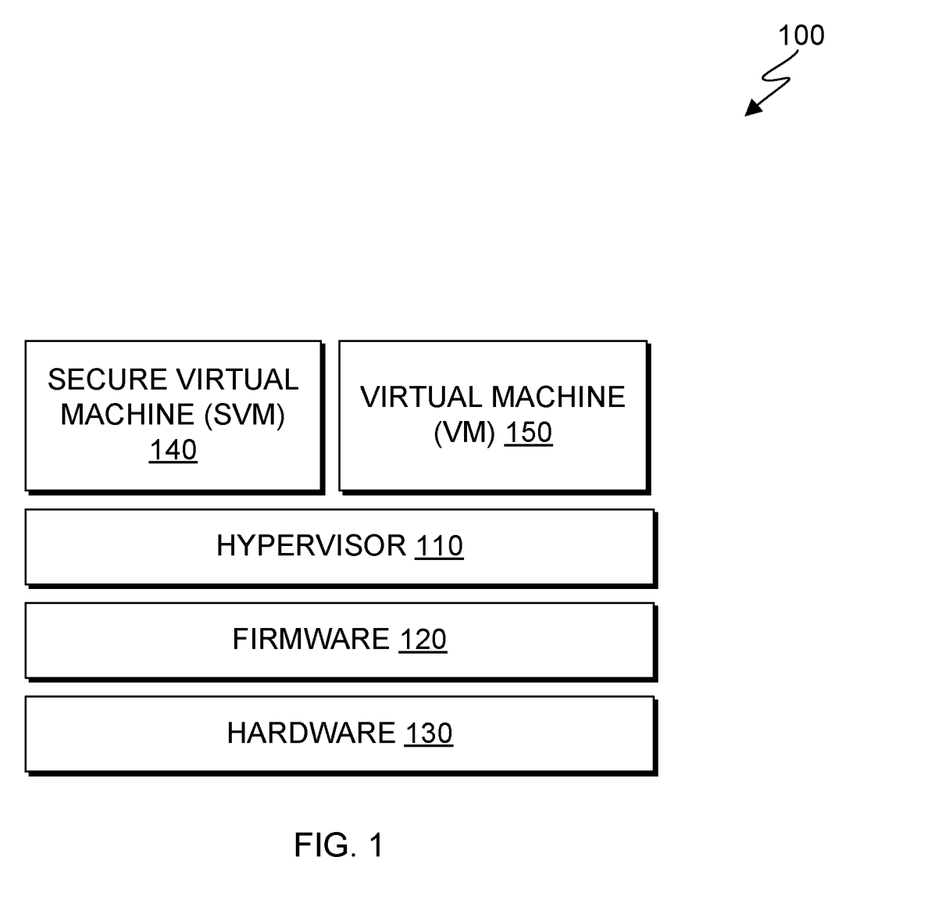
FIG. 1 is a block diagram of a data processing system, in accordance with an embodiment of the present invention.

FIG. 1 is a block diagram of data processing system 100, in accordance with an embodiment of the present invention. Data processing system 100 includes operating system 110, firmware 120, hardware 130, SVM 140, and VM 150. In one embodiment, components of data processing system 100 may be interconnected via a network (not depicted) for example, a local area network (LAN), a wide area network (WAN) such as the Internet, or a combination of the two, and include wired, wireless, or fiber optic connections. Data processing system 100 may be a desktop computer, laptop computer, specialized computer server, or any other computer system known in the art. In certain embodiments, data processing system 100 may represent computer systems utilizing clustered computers and components to act as a single pool of seamless resources when accessed through a network. For example, such embodiments may be used in data center, cloud computing, storage area network (SAN), wide area network (WAN), and network attached storage (NAS) applications. In general, the computing systems described herein are representative of any electronic device, or combination of electronic devices, capable of executing machine-readable program instructions, in accordance with an embodiment of the present invention, as described in greater detail with regard to FIG. 9. In this embodiment, data processing system 100 is implemented in various cloud computing environments, as described in greater detail with regard to FIGS. 10 and 11.

Hypervisor 110 represents a system software, such as a virtual machine monitor (VMM) configured to manage, create, and execute SVM 140 and VM 150. Hypervisor 110 is an untrusted system software component. Furthermore, hypervisor 110 is part of one security domain, along with VM 150 (i.e., virtual machines that are not protected by SMF security capabilities).

Firmware 120 represents a trusted system software component configured to provide control, monitor and manipulate data executed by trusted hardware 130. In this embodiment, firmware 120 manages a second security domain, referred to as a secure memory domain. Furthermore, each SVM 140 is assigned to the secure memory domain. Firmware 120 operates in an ultravisor mode, which is a privilege level above hypervisor 110 mode. In the ultravisor mode, firmware 120 is configured to control the regular partition scoped address translation mechanism, along with hardware 130 for maintain separation between the two security domains. Additionally, firmware 120 is configured to maintain separation of each SVM 140 within the secure memory domain.

Hardware 130 mechanisms may be used to invoke firmware 120 whenever a transition between the two security domains occurs, thus enabling firmware 120 to assure that the state of a process in one security domain is properly isolated from the state of a process in the other security domain.

Subsystems of data processing system 100 (not depicted) may interact with data processing system 100 memory independently of hardware 130 components, such as a processor. These subsystems may be modified such that all untrusted devices (e.g., Input/Output (I/O) devices) cannot access the secure memory domain. Subsystem data which is secure may be encrypted in the non-secure memory domain. Furthermore, firmware 120 operating in an ultravisor state may read the encrypted data and decrypt the data, at the storage operation, into the secure memory domain. Similarly, secure data in the secure memory domain may be encrypted and may have a secure hash added before being stored in hypervisor 110/VM 150 memory domain. The encrypted data can thereafter be paged out by hypervisor 110 to disk storage. Accordingly, data and state information related to SVM 140 will not be in a clear text format outside the secure memory domain and is integrity protected by the secure hash.

Hardware 130 represents hardware components for data processing system 100. In this embodiment, an SMF-enabled processor is included in hardware 130 and has a set of asymmetric keys and may have associated symmetric keys that are used for protecting the secure data handled by SVM 140.

SVM 140 is similar to VM 150, but is packaged for SMF with secure data which is encrypted with a public SMF key of a target processor. A private SMF key may be protected by a Trusted Platform Module (TPM) and becomes available only when the correct firmware 120 is loaded during boot. In this embodiment, a trusted entity that manufactures and distributes the SMF-enabled processors issues certificates for their public keys.

The descriptions of the various embodiments of the present invention have been presented for the purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 2:
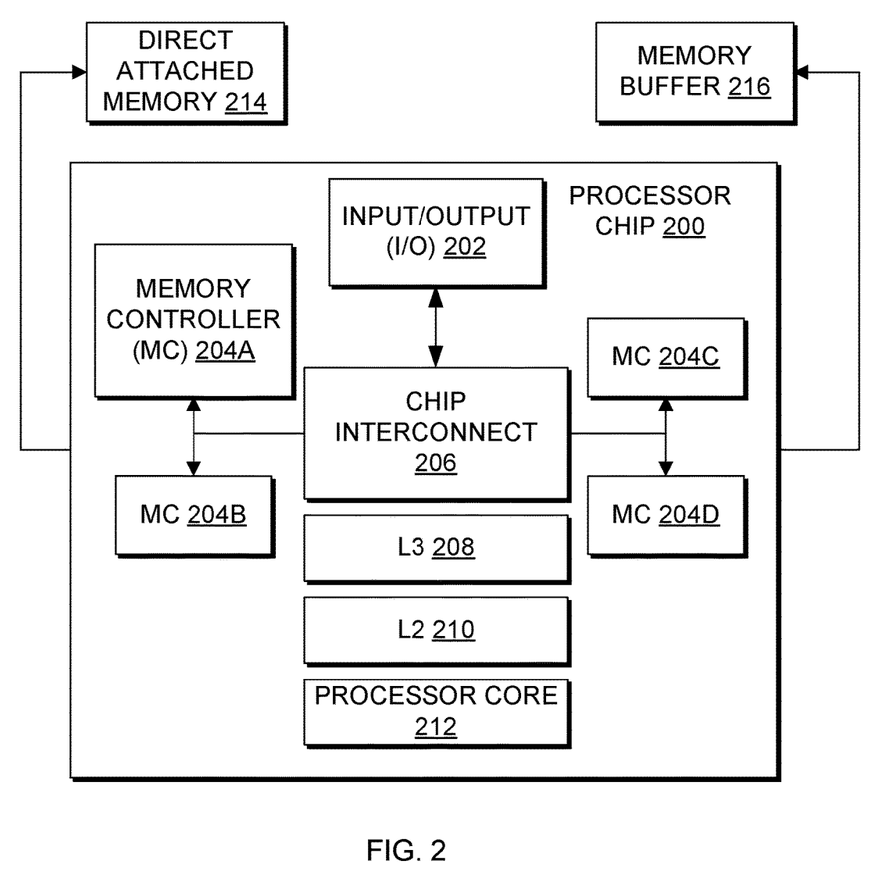
FIG. 2 is a block diagram of a processor chip, in accordance with an embodiment of the present invention.

FIG. 2 is a block diagram of processor chip 200, in accordance with an embodiment of the present invention. In this embodiment, memory controllers (MCs) 204A and 204B are operatively coupled to direct attached memory 214 (e.g., DRAM chips) and/or a memory buffer chip. Furthermore, MCs 204C and 204D is operatively coupled to memory buffer 216 as intermediate to provide large size memories.

MCs 204A-D are inside processor chip 200 and are operatively coupled to chip interconnect 206. In this embodiment, chip interconnect 206 is a bus structure that connects all other devices on processor chip 200 and supports coherence. For example, many different blocks may be connected to the bus of chip interconnect 206, such as L3 208 caches, with associated connected L2 210 caches, and processor core 212, as well as all other devices such as coherent accelerators (capi), PCIe links, high speed links for SMP coherence, etc. Programs executed on processor core 212 may use effective addresses, and address translation is performed by processor core 212 to generate a physical real addresses for transport on the chip interconnect 206 bus.

Figure 3:
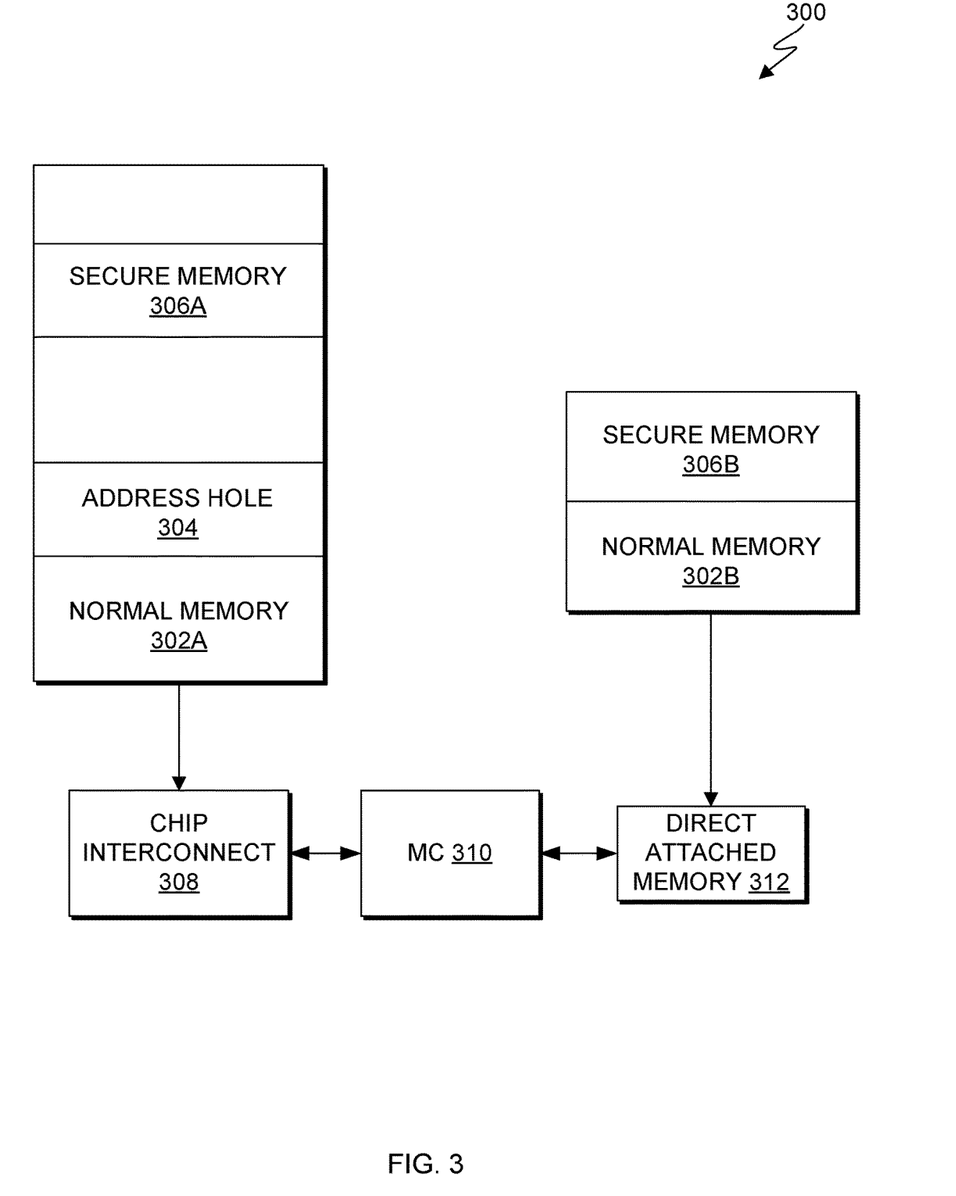
FIG. 3 is a block diagram illustrating allocation of secure memory, in accordance with an embodiment of the present invention.

FIG. 3 is a block diagram illustrating allocation of secure memory 306A-B in system 300, in accordance with an embodiment of the present invention. In this embodiment, larger address ranges of the real address RA[8 . . . 63] are transported on chip interconnect 308 bus. The 55 bits wide RA[8 . . . 63] real address enables to address 36 petabytes, which is much larger as the total size of each MC 310 connected memory (e.g., DRAM, DIMMS, memory buffer chips, etc.) that system 300 supports. To specify secure memory 306A, a bit position referred to as "x" of RA[8 . . . 63] will distinguish between secure memory 306A and normal memory 302A on the chip interconnect 308 bus, as well as for all blocks connected to the bus. In this embodiment, the x bit is in an address range that is above the maximum memory size supported by system 300. Furthermore, a predefined range of memory that system 300 supports is selected for which the x bit will be set. This selection of an address range for secure memory may be performed for each MC 310 with its connected memory (e.g., DRAM, DIMMS, memory buffer chips, etc.) individually.

Address hole 304 is defined in the normal memory range on the chip interconnect 308 bus and the secure memory 306A is allocated in the corresponding memory range with RA[x]=1. In this embodiment, if the RA address is in the secure memory 306A valid range, then MC 310 will reset the RA[x] bit before addressing direct attached memory 312 (DIMMs) or memory buffer chips (not depicted). Subsequently, secure data will be read by the Direct Attached Memory 312 from the RA[x]=0 associated address and by MC 310 sent to the chip interconnect 308 bus. In the same way, secure data may be written by the Direct Attached Memory 312 at the RA[x]=0 associated address. In this manner, MC 310 may be extended with a small circuit as will be show, as described in greater detail with respect to FIG. 6, and all other MC 310 logic may stay the same. In another embodiment, if a device attempts to access address hole 304 (RA[x]=0) using a RA address on chip interconnect 308 bus that corresponds to the secure memory 306B range of direct attached memory 312 (e.g., DIMMs), then MC 310 may detect a secure access violation and may not access the data on direct attached memory 312.

Figure 4:
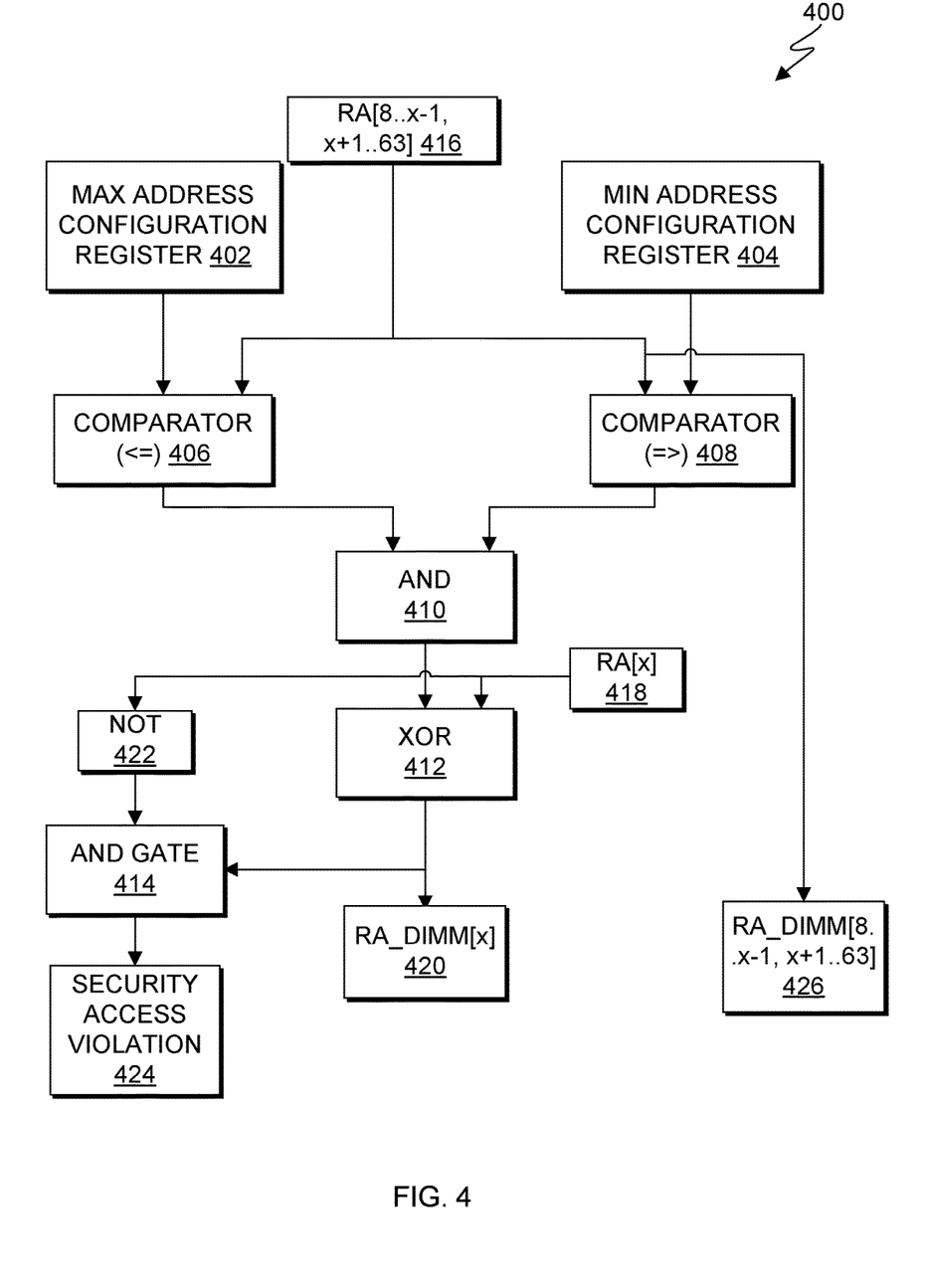
FIG. 4 is a block diagram of logic additions to a memory controller for secure memory allocation, in accordance with an embodiment of the present invention.

FIG. 4 is a block diagram of logic additions to a memory controller for secure memory allocation, in accordance with an embodiment of the present invention. In this embodiment, real address bits RA[8 . . . x−1, x+1 . . . 63] 416 and RA[x] 418 are part of the chip interconnect bus. In this embodiment, one of the real address (RA) bits is referred to as RA[x] 418, where "x" is the bit which is selected for distinguishing between the secure memory and the normal memory range. The bit "x" will be selected such that it is an address bit which is above the range of memory actually supported by the data processor system.

In this embodiment, maximum address configuration register 402 of the memory controller is added, such that maximum address configuration register 402 is set to the maximum real address of the secure memory range. Furthermore, minimum address configuration register 404 of the memory controller is added, and is set for the particular memory controller to the minimum real address of the secure memory range. The write address of configuration registers 402 and 404 is setup at boot time to be into the Secure Memory RA[x]=1 space. Therefore the min address and max address stored in configuration registers 402 and 404 are protected from modification by chip interconnect bus commands send by untrusted blocks as the untrusted blocks are enhanced such that only commands with send RA[x]=0 addresses can be send the chip interconnect bus. Trusted blocks connected to chip interconnect bus 308 may set the RA[x] bit and therefore are able to reconfigure configuration registers 402 and 404. The secure memory data needs to be erased or encrypted before the secure memory is reallocated to normal memory. In another embodiment, configuration registers 402 and 404 are protected by making them scan only. For example, scanning of new data into configuration registers 402 and 404 may only be performed by trusted hardware engines, such as a boot engine or power management engine. Furthermore, during the next to boot time configuration registers 402 and 404 may be reconfigured by trusted hardware engines, as long as the secure memory data is erased before the secure memory is reallocated to normal memory.

Maximum address configuration register 402 and minimum address configuration register 404 are connected to comparator (<=) 406 and comparator (>=) 408, respectively, which detect whether the RA is in the secure memory range. In this embodiment, bit RA[x] 418 is not compared, and is used to identify a match for the address hole (i.e., RA[x]=0) as well as the secure memory range (i.e., RA[x]=1) when the RA is between the maximum and minimum value. In one embodiment, lower order bits of configuration registers 402 and 404 may be masked (not depicted) to not be taken into account into the compare according to the size of the secure memory range. In another embodiment, RA[x] may be taken into account and there may be separate comparators for detection of the address hole and the secure memory range.

In the embodiment of FIG. 4, if the RA is in the secure memory range or corresponds to the address hole, since RA[x] 418 is not part of the compare, the outputs of comparators 406 and 408 are set to 1 and the AND gate 410 will report a hit by the AND output set to 1. Furthermore, RA[x] 418 bit is inverted by XOR 412 before sending the address RA_DIMM[x] 420 along with the other address bits 426 to the memory controller attached DIMMs. In this instance, the hit represents secure memory 306A the RA_DIMM[x] 420 signal will be set to 0 and DIMM data is read or written. Otherwise if the hit represents the address hole 304 the RA_DIMM[x] 420 signal will be set to 1 and the address is outside the supported system memory range. No DIMM data is read or written. If no hit is reported the AND 410 output is set to 0. Accordingly the XOR 412 output is set to same value as the RA[x] 418 input. With no hit and RA[x] 418 set to 0, normal memory may need to be accessed at the DIMMS. With RA[x] 418 set to 1, the address will be secure memory but outside the address range configured by the local MC configuration registers 402 and 404. In this case the secure memory attached to another MC with its own configuration registers may hit and read or write the data from the memory attached to the MC with matching configuration registers. In another embodiment, RA[x] 418 is set to a value of 0 and the output of NOT 422 is set to 1 as being the inverted input of RA[x] 418. If there is a hit with RA[x] 418 is 0 (e.g., a load/store addressing normal memory, but configuration registers 402 and 404 do match the memory range setup for the particular memory controller) then the address matches the address hole 304. Then the output of AND gate 414 reports security access violation

424. As RA_DIMM[x] 420 is set to 1 (address outside the system supported memory range) accordingly, no data is returned or stored.

Figure 5:
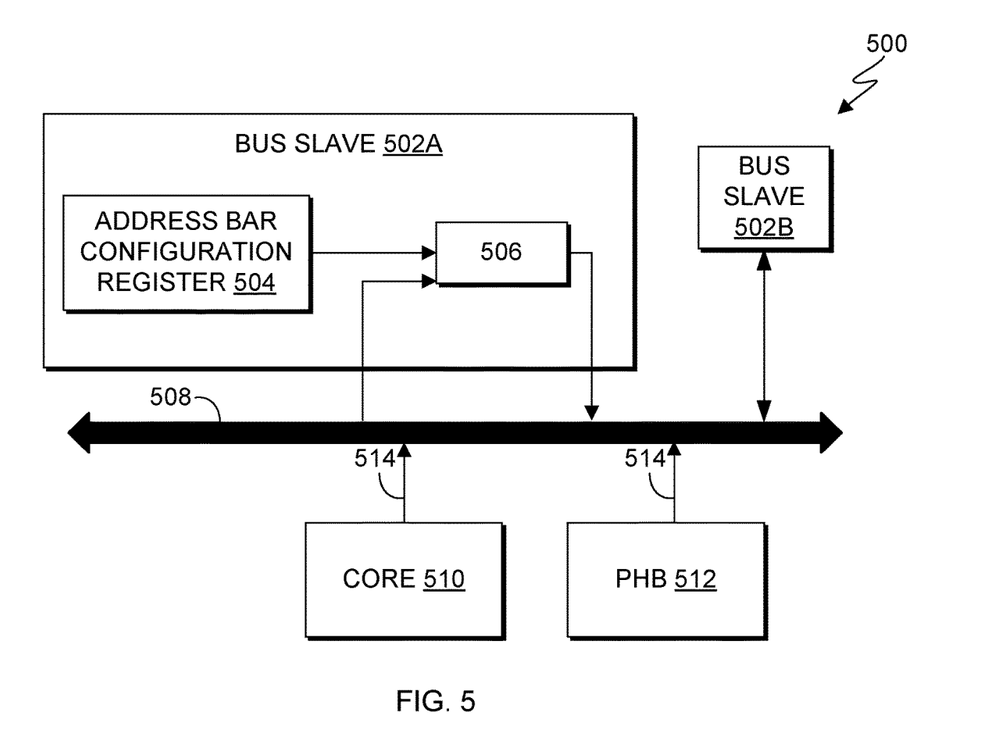
FIG. 5 is a block diagram of a Base Address Register (BAR), in accordance with an embodiment of the present invention.

FIG. 5 is a block diagram of a Base Address Register (BAR), in accordance with an embodiment of the present invention. In this embodiment, chip interconnect bus 508 is operatively coupled to bus slaves 502A-B and bus masters 514. Bus masters 514 may initiate commands, such as load and stores on the bus. Bus slave 502A compares the real address of the commands, via block 506, on bus 508 and based on the address BAR configuration register 504 and determines whether bus slave 502A executes and responds with an acknowledge to the command. The same compare is done by all other Bus slaves. In a typical system setup only a single bus slave may have a matching address BAR configuration value to the command address field and accordingly a single acknowledge is send as a response to the command.

If the address matches and acknowledge is sent back to bus 508, then corresponding data may be executed, stored or loaded by bus slave 502A according to the requesting command. If the RA[x] corresponding bit is set to 1 in Address BAR configuration register 504, then it is protected from modification by commands initiated by untrusted master states. As the RA[x] bit cannot be set by a untrusted master, no 'ack' will be send as the RA[x] bit corresponding bit in the Address BAR configuration register 504 will never match. Therefore the setting of the RA[x] to 1 or 0 provides a process to specify if bus slave 502 responds to commands indicated as secure by setting the RA[x] bit, or only responds to commands with RA[x]=0. In this embodiment, no hardware components are modified, instead the setting of the RA[x] bit in address BAR configuration register 504 will determine whether an acknowledge will occur.

If bus slave 502A is required to respond to both types of commands, then address BAR configuration register 504 may be duplicated and depend on the hit different execution flows may be triggered storing the data in secure memory or normal memory. In this embodiment, bus masters 514 initiate the commands and associated RAs, and are enhanced with logic setting the RA[x] bit. For example, the cores may force the RA[x] bit to be set to 0 if the command is issued in a hypervisor state. In the core ultravisor state RA[x] can be set to 0 and 1 and in ultravisor state the core may access secure memory and Bus Slaves with the RA[x] bit set to 1 in the matching address bar configuration register 504. In this embodiment, other components, such as PHB 512 with access to I/O may not be trusted and is always required to write into normal memory.

Figure 6:
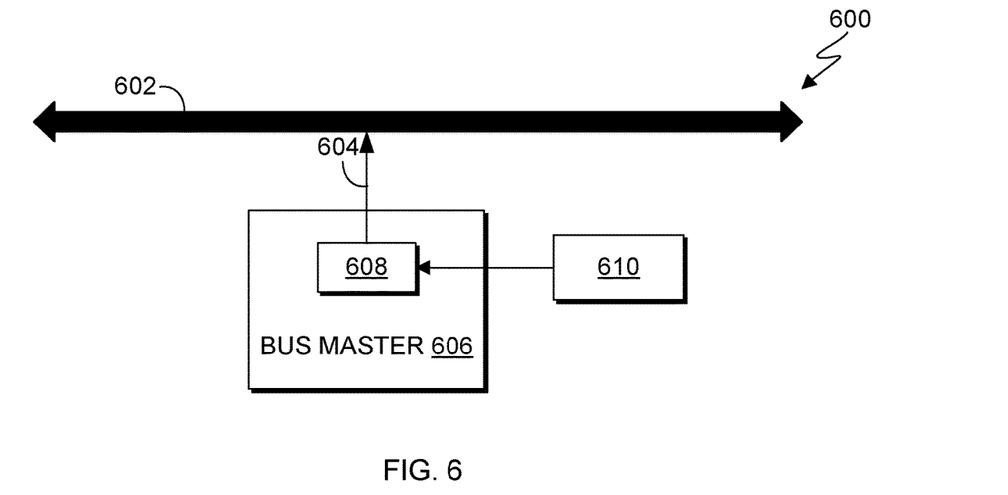
FIG. 6 is a block diagram of the circuitry added to each bus master, in accordance with an embodiment of the present invention.

FIG. 6 is a block diagram of the circuitry added to bus master 606, in accordance with an embodiment of the present invention. In this embodiment, bus master 606 is configured such that it will always write into normal memory (or only may receive an acknowledge from one of bus slaves 502 with the associated Address BAR configuration register RA[x] bit set to 0). The RA[x] bit is always set to zero. If bus master 606 would receive a request to access the bus with RA[x]=1 then this is detected and a security violation is reported by for example setting an error bit. Since the RA[x] is always set to 0, it is guaranteed that secure data may not be returned. In this embodiment, bus master 606 may not access secure memory 608 by forcing the RA[x] bit to be set to 0 and detecting the request to set RA[x]=1 as a security violation (represented by block 610). In addition, bus master 606 may be configured to support both types of accesses, with the forcing logic according to the secure or normal type of state the command is issued. Furthermore, 602 represents a chip interconnect, and flow 604 represents RA[8 . . . 63] bits. All other bits of the chip interconnect bus are not depicted.

Figure 7:
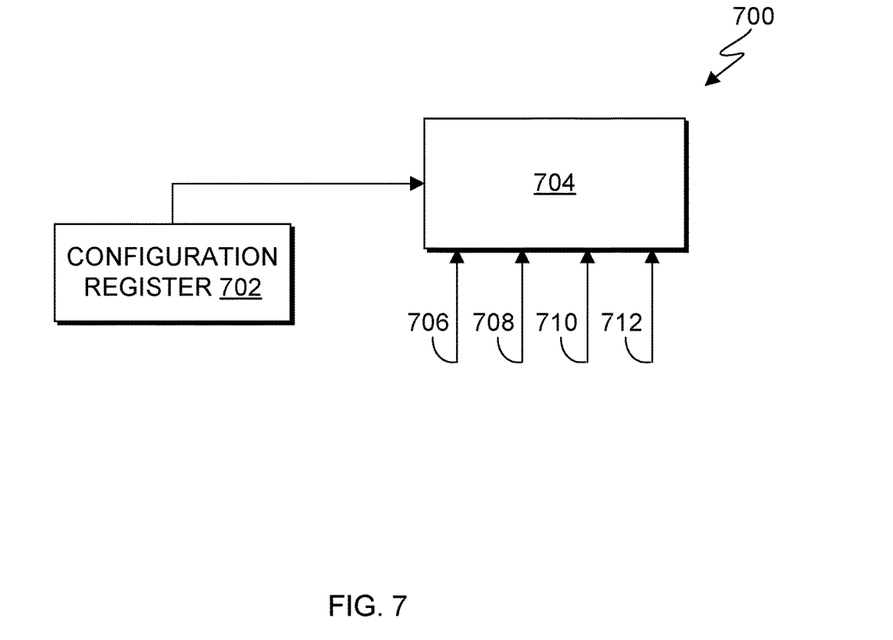
FIG. 7 is a block diagram illustrating how a real address bit defining secure memory may depend on system configuration, in accordance with an embodiment of the present invention.

FIG. 7 is a block diagram illustrating how a real address bit defining secure memory may depend on system configuration, in accordance with an embodiment of the present invention. In this embodiment, bit 62 and 63 of configuration register 702 is set to 00 for systems in which there is no secure memory at all (represented by 706). If 01 is set the RA[15] is selected as bit for the RA[x] compare (represented by 708). If 10 is set RA[17] is used (represented by 710) and for 11 the RA[19] is used (represented by 710). It is clear to a person of ordinary skill in the art, that this scheme can be extended to more bits or reduced to a single bit.

Figure 8:
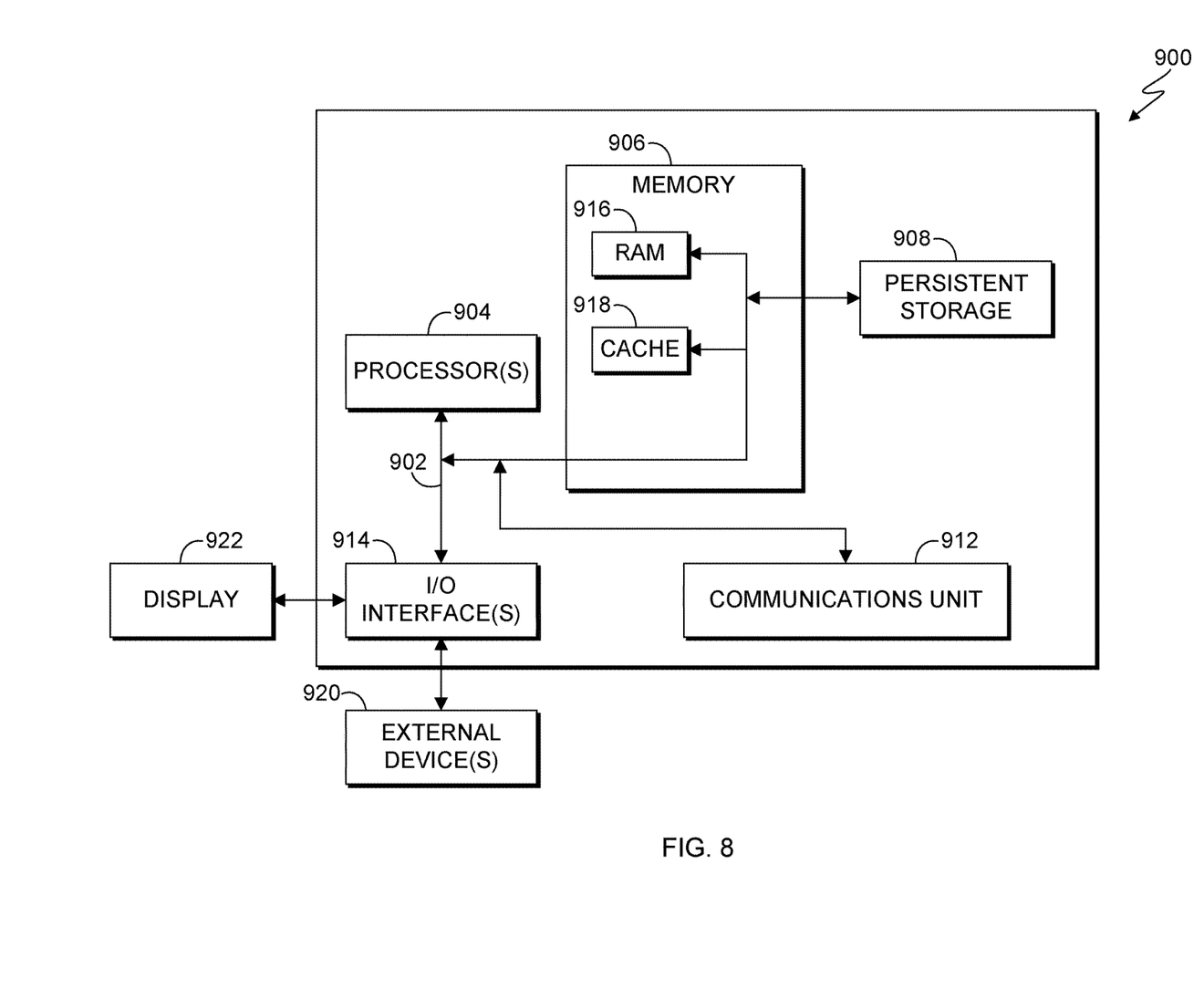
FIG. 8 is a block diagram of internal and external components of the computer system of FIG. 1, in accordance with an embodiment of the present invention.

FIG. 8 is a block diagram of internal and external components of a computer system 900, which is representative the computer systems of FIG. 1, in accordance with an embodiment of the present invention. It should be appreciated that FIG. 8 provides only an illustration of one implementation and does not imply any limitations with regard to the environments in which different embodiments may be implemented. In general, the components illustrated in FIG. 8 are representative of any electronic device capable of executing machine-readable program instructions. Examples of computer systems, environments, and/or configurations that may be represented by the components illustrated in FIG. 8 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cognitive computing environments that include any of the above systems or devices.

Computer system 900 includes communications fabric 902, which provides for communications between one or more processors 904, memory 906, persistent storage 908, communications unit 912, and one or more input/output (I/O) interfaces 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 506 includes random access memory (RAM) 916 and cache memory 918. In general, memory 906 can include any suitable volatile or non-volatile computer-readable storage media. Software is stored in persistent storage 908 for execution and/or access by one or more of the respective processors 904 via one or more memories of memory 906.

Persistent storage 908 may include, for example, a plurality of magnetic hard disk drives. Alternatively, or in addition to magnetic hard disk drives, persistent storage 908 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 908 can also be removable. For example, a removable hard drive can be used for persistent storage 908. Other examples include optical and magnetic disks, thumb drives, and smart cards that are inserted into a drive for transfer onto another computer-readable storage medium that is also part of persistent storage 908.

Communications unit 912 provides for communications with other computer systems or devices via a network. In this exemplary embodiment, communications unit 912 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 912 (e.g., via the Internet, a local area network or other wide area network). From communications unit 912, the software and data can be loaded onto persistent storage 908.

One or more I/O interfaces 914 allow for input and output of data with other devices that may be connected to computer system 900. For example, I/O interface 914 can provide a connection to one or more external devices 920, such as a keyboard, computer mouse, touch screen, virtual keyboard, touch pad, pointing device, or other human interface devices. External devices 920 can also include portable computer-readable storage media such as, for example, thumb drives, portable optical or magnetic disks, and memory cards. I/O interface 914 also connects to display 922.

Display 922 provides a mechanism to display data to a user and can be, for example, a computer monitor. Display 922 can also be an incorporated display and may function as a touch screen, such as a built-in display of a tablet computer.

Figure 9:
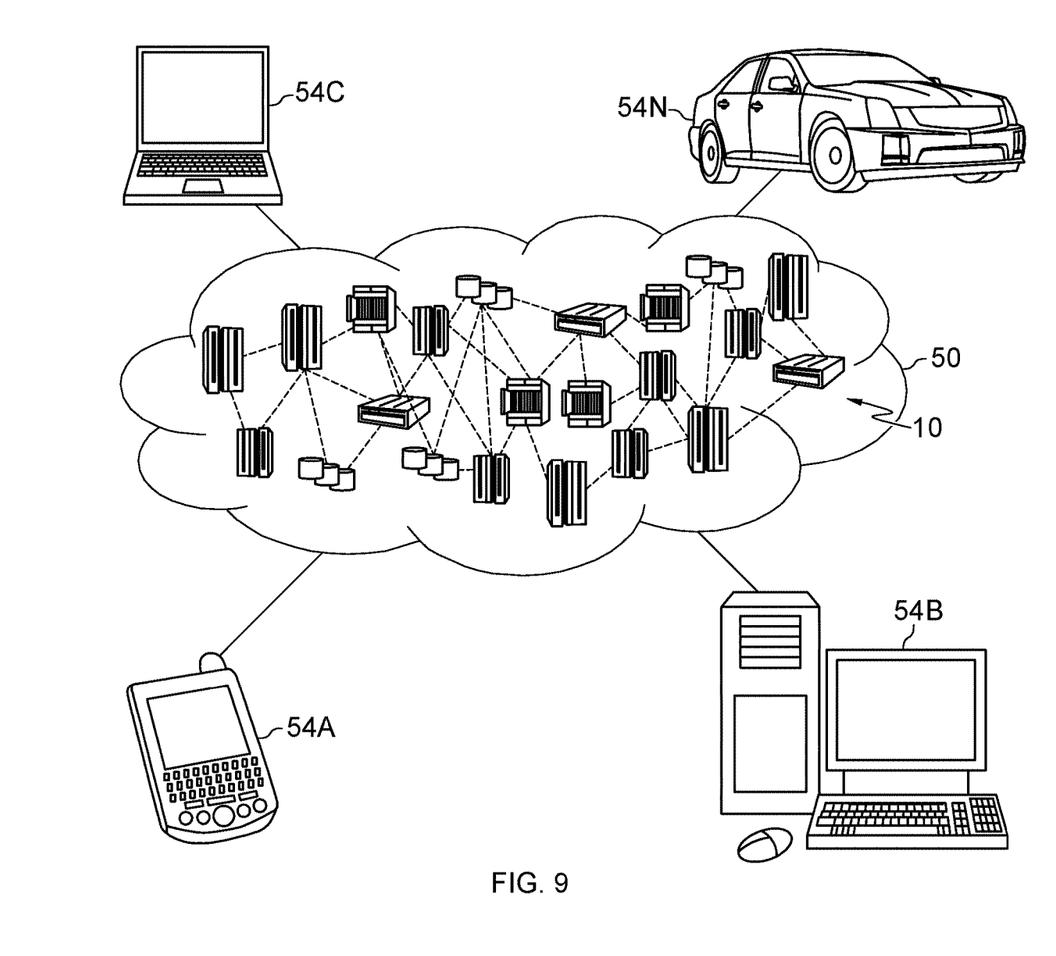
FIG. 9 depicts a cloud computing environment, in accordance with an embodiment of the present invention.

Referring now to FIG. 9, illustrative cognitive computing environment 50 is depicted. As shown, cognitive computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cognitive computing environment 50 to offer infrastructure, platforms and/or software as services for which a cloud consumer does not need to maintain resources on a local computing device. The types of computing devices 54A-N shown in FIG. 9 are intended to be illustrative only and that cloud computing nodes 10 and cognitive computing environment 50 can communicate with any type of computerized device over any type of network and/or network addressable connection (e.g., using a web browser).

Figure 10:
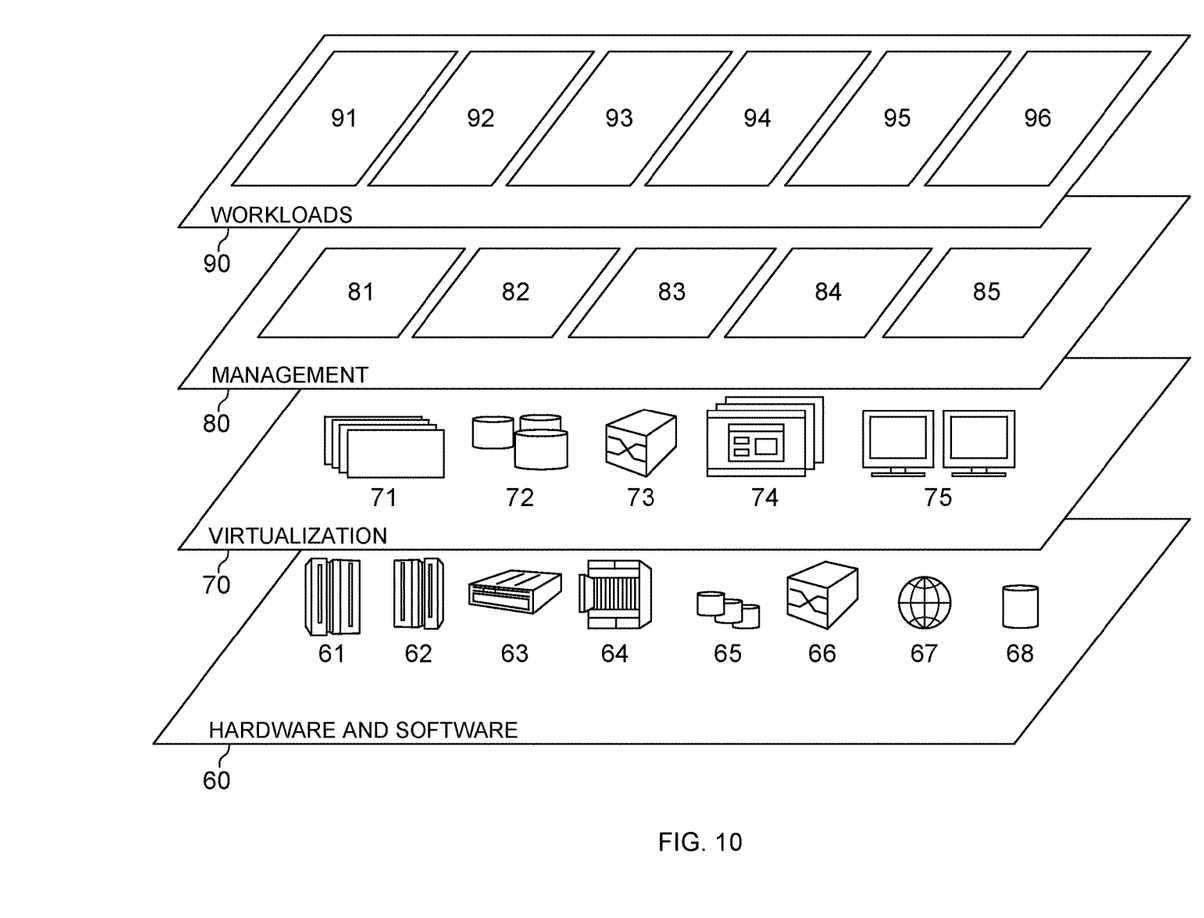
FIG. 10 depicts abstraction model layers, in accordance with an embodiment of the present invention.

Referring now to FIG. 10, a set of functional abstraction layers provided by cognitive computing environment 50 (FIG. 9) is shown. The components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cognitive computing environment. Metering and Pricing 82 provide cost tracking as resources are utilized within the cognitive computing environment, and billing or invoicing for consumption of these resources. In one example, these resources may comprise application software licenses. Security provides identity verification for cloud consumers and tasks, as well as protection for data and other resources. User portal 83 provides access to the cognitive computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cognitive computing environment may be utilized. Examples of workloads and functions which may be provided from this layer include: mapping and navigation 91; software development and lifecycle management 92; virtual classroom education delivery 93; data analytics processing 94; transaction processing 95; and appetite improvement system 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cognitive computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cognitive computing environment is service oriented with a focus on statelessness, low coupling, modularity, and semantic interoperability. At the heart of cloud computing is an infrastructure comprising a network of interconnected nodes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer system comprising:
   a hardware processor to process data in a first mode and a second mode, and send commands to a chip interconnect bus using real addresses, wherein the chip interconnect bus transports a number of bits for the real addresses, wherein the chip interconnect bus is larger than a number of bits needed for a maximum memory range supported by the computer system, and wherein a first portion of the bits for real addresses which are not in the range of the supported maximum memory range is used to indicate whether to operate in the first mode or the second mode creating a memory address hole;
   a memory controller operatively coupled to a memory component;
   the hardware processor further is capable of performing a method comprising:
      specifying a secure memory range by using range registers;
      responsive to determining that the real address is detected to be in the secure memory range to match a memory component address, setting a real address bit;
      responsive to determining that the real address is in the memory address hole, detecting a security access violation; and
      responsive to determining that the real address is not in the secure address range and the real address bit is set, detecting the security access violation.

2. The computer system of claim 1, wherein the chip interconnect bus operatively coupled to bus slaves which are configured to be part of a secure memory or a normal memory, in accordance with the each of the bus slaves trusted or non-trusted functionality specified by the real address bit stored in a register.

3. The computer system of claim 2, wherein the hardware processor further is capable of performing a method comprising:
   responsive to determining that the real address bit is set to a first value, restricting one of the bus slaves from accessing the secure memory and detecting the security access violation.

4. The computer system of claim 3, further comprising:
   a bus master operated, by the hardware processor, to write into the normal memory, wherein the bus master is a component of a base address register and modified to send commands to the chip interconnect bus, and wherein the bus slaves respond to the commands;
   responsive to an untrusted block initiating the commands, the bus master operated, by the hardware processor, to set one of the bits for the real address to the first value; and
   responsive to the untrusted block attempting to access secure components, reporting an error.

5. The computer system of claim 1, wherein the computer system includes a configuration register configured to select the bits of the real addresses, based on the computer system memory configuration.

6. The computer system of claim 5, wherein the computer system memory configuration is selected from a plurality memory configurations, and wherein one of the plurality of memory configurations does not include a secure memory.

7. The computer system of claim 1, wherein the first mode is a normal operation mode and the second mode is a secure operation mode.

8. The computer system of claim 1, wherein the memory component includes dual in-line memory modules (DIMMs), and wherein the memory component includes at least one of: a direct attached memory component and a memory buffer chip.

* * * * *